US012726782B2

(12) United States Patent
Kato

(10) Patent No.: US 12,726,782 B2
(45) **Date of Patent: *Sep. 1, 2026**

(54) STEREOPHONIC SOUND IMAGE REPRODUCING SYSTEM FOR VEHICLE

(71) Applicant: SUBARU CORPORATION, Tokyo (JP)

(72) Inventor: Hideaki Kato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 118 days.

This patent is subject to a terminal disclaimer.

(21) Appl. No.: 18/890,904

(22) Filed: Sep. 20, 2024

(65) Prior Publication Data

US 2025/0113155 A1 Apr. 3, 2025

(30) Foreign Application Priority Data

Sep. 29, 2023 (JP) ................................ 2023-169446

(51) Int. Cl.
*H04S 7/00* (2006.01)

(52) U.S. Cl.
CPC ................ *H04S 7/303* (2013.01); *H04S 7/40* (2013.01); *H04R 2499/13* (2013.01)

(58) Field of Classification Search
CPC ............................ H04S 7/303; H04R 2499/13
USPC ......................................................... 381/303
See application file for complete search history.

(56) References Cited

U.S. PATENT DOCUMENTS

| | | | | |
|---|---|---|---|---|
| 11,736,881 | B2 * | 8/2023 | Kasugai | H04S 5/005 381/302 |
| 2018/0268804 | A1 * | 9/2018 | Niibe | H04R 3/00 |
| 2023/0311921 | A1 * | 10/2023 | Maruyama | G06V 20/58 340/435 |
| 2024/0140468 | A1 * | 5/2024 | Miura | B60W 50/14 |

FOREIGN PATENT DOCUMENTS

| | | | |
|---|---|---|---|
| JP | 2009-301123 | A | 12/2009 |
| JP | 2014-127935 | A | 7/2014 |
| JP | 2014-127936 | A | 7/2014 |

* cited by examiner

*Primary Examiner* — Sean H Nguyen
(74) *Attorney, Agent, or Firm* — Rimon P.C.

(57) ABSTRACT

A stereophonic sound image reproducing system includes a sound reproducing apparatus and a vehicle sensor that detects a facial direction of a driver or a traveling direction of a vehicle. Before starting to generate a sound image, the sound reproducing apparatus sets a localization allowable angle range extending from a reference direction that is the facial direction of the driver or the traveling direction of the vehicle, and determines whether an original localization position of the sound image is located within the localization allowable angle range. When the original localization position is determined to be located within the localization allowable angle range, the sound reproducing apparatus starts generating the sound image at the original localization position. When the original localization position is determined not to be located within the localization allowable angle range, the sound reproducing apparatus refrains from generating the sound image at the original localization position.

5 Claims, 7 Drawing Sheets

STEREOPHONIC SOUND IMAGE REPRODUCING SYSTEM FOR VEHICLE

CROSS-REFERENCE TO RELATED APPLICATIONS

The present application claims priority from Japanese Patent Application No. 2023-169446 filed on Sep. 29, 2023, the entire contents of which are hereby incorporated by reference.

BACKGROUND

The disclosure relates to a stereophonic sound image reproducing system for a vehicle.

Japanese Unexamined Patent Application Publication (JP-A) No. 2009-301123 discloses generating a sound image localized on an obstacle outside a vehicle.

JP-A No. 2014-127935 discloses generating a sound image localized at a predicted gazing point on an object such as a preceding vehicle.

JP-A No. 2014-127936 discloses generating a sound image localized at a predicted gazing point to guide the line of sight of a driver.

SUMMARY

An aspect of the disclosure provides a stereophonic sound image reproducing system for a vehicle. The stereophonic sound image reproducing system includes speakers configured to be disposed in the vehicle, a sound reproducing apparatus, and a vehicle sensor. The sound reproducing apparatus includes a sound image generator configured to generate, with the speakers, a sound image localizable at least in a longitudinal direction of the vehicle. The vehicle sensor is configured to detect: one or both of a facial direction of a driver who drives the vehicle and a traveling direction of the vehicle; or one or both of a line-of-sight direction of the driver and the traveling direction of the vehicle. Before the sound image generator starts to generate the sound image at an original localization position of a sound source, the sound reproducing apparatus is configured to set an angle range extending from a reference direction in a lateral direction of the vehicle as a localization allowable angle range. The reference direction is the facial direction of the driver, the line-of-sight direction of the driver, the traveling direction of the vehicle, a direction between the facial direction of the driver and the traveling direction of the vehicle, or a direction between the line-of-sight direction of the driver and the traveling direction of the vehicle that is detected by the vehicle sensor before the sound image is generated. The sound reproducing apparatus is further configured to determine whether the original localization position of the sound image starting to be generated is located within the localization allowable angle range. When the original localization position of the sound image starting to be generated is determined to be located within the localization allowable angle range, the sound reproducing apparatus is configured to start to generate, with the sound image generator, the sound image at the original localization position. When the original localization position of the sound image starting to be generated is determined not to be located within the localization allowable angle range, the sound reproducing apparatus is configured to refrain from starting to generate the sound image at the original localization position.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to explain the principles of the disclosure.

DETAILED DESCRIPTION

Figure 1:
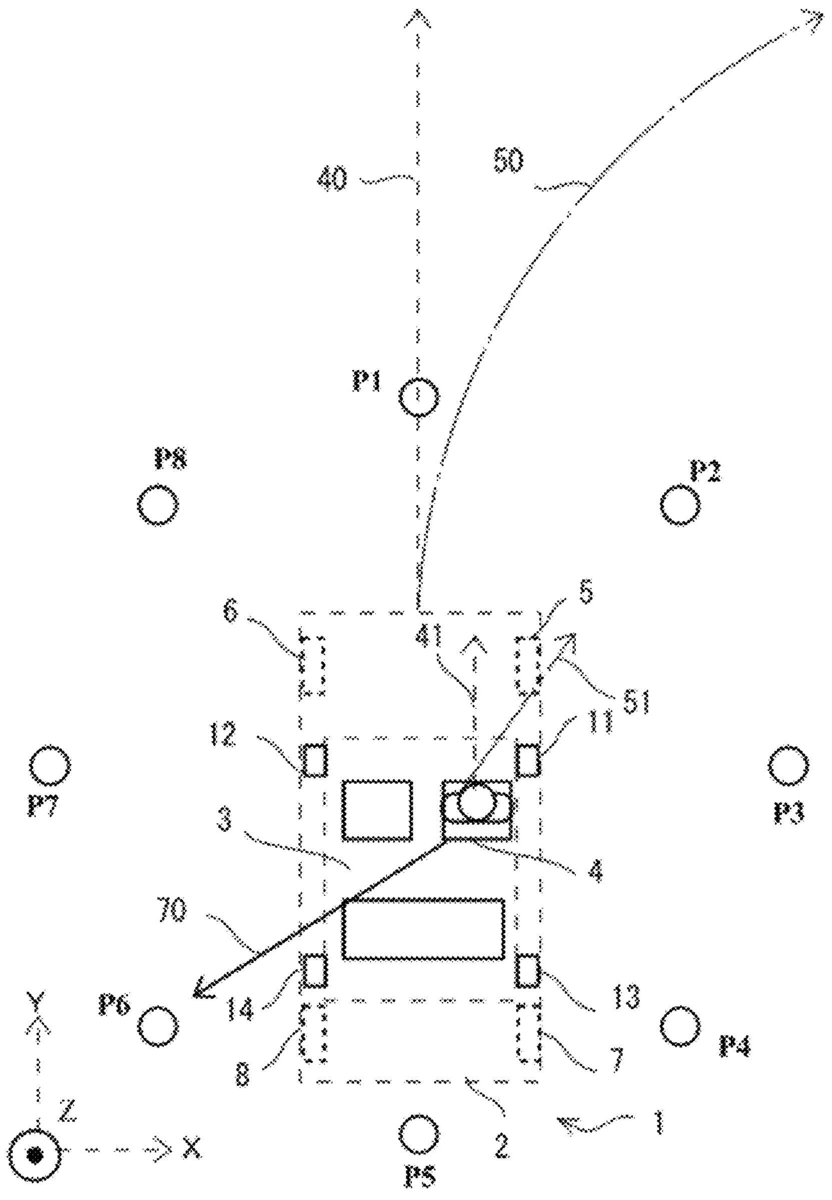
FIG. 1 is an explanatory diagram illustrating an exemplary state of generation of a stereophonic sound image in an automobile to which a stereophonic sound image reproducing system according to one example embodiment of the disclosure is applicable.

A technique has been proposed that generates a sound image having a localization position of a sound source with speakers disposed in a vehicle.

However, when such a sound image having a localization position is generated, a driver who drives the vehicle turns his/her attention to the localization position of the sound image.

JP-A Nos. 2009-301123, 2014-127935, and 2014-127936 each merely disclose an example where a sound image is localized at a position on a front side of a vehicle or a position in front of a driver who drives the vehicle; however, a sound image generated in a vehicle can be localized at a position on a rear side of the vehicle or a position behind a driver in some cases.

In these cases, the driver is prone to direct the line of sight toward the rear side of the vehicle that is opposite to a traveling direction of the vehicle. For example, the driver is prone to direct the face or line of sight toward a sound image localized at a position on the rear side of the vehicle to clearly recognize the sound image.

It is desirable to provide a stereophonic sound image reproducing system that suppresses, when being applied to a vehicle, excessive behavior of a driver caused by a localized sound image.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

First Example Embodiment

FIG. 1 is an explanatory diagram illustrating an exemplary state of generation of a stereophonic sound image in an automobile 1 to which a stereophonic sound image reproducing system 10 according to a first example embodiment of the disclosure is applicable.

In one embodiment, the automobile 1 may serve as a "vehicle". Other examples of the vehicle in which an occupant such as a driver rides may include a bus, a truck, a train, and a personal mobility.

The automobile 1 may have a vehicle body 2 as illustrated in FIG. 1. The vehicle body 2 may have a vehicle compartment 3 in which an occupant such as the driver rides. The vehicle compartment 3 may be provided with seats including a driver's seat 4. The driver who manages travel of the automobile 1 may be seated in the driver's seat 4. Occupants other than the driver may be seated in the seats other than the driver's seat 4.

Wheels may be provided at a right-front side, a left-front side, a right-rear side, and a left-rear side of the vehicle body 2. For example, a right-front wheel 5, a left-front wheel 6, a right-rear wheel 7, and a left-rear wheel 8 may be provided. In manual driving performed by the driver or automated driving, driving wheels out of the wheels may be rotated by a non-illustrated power source to cause the automobile 1 to travel. Further, in the manual driving performed by the driver or the automated driving, steered wheels out of the wheels may be steered by the non-illustrated power source to change the traveling direction of the automobile 1 from a straight advancing direction indicated by a broken-line arrow 40 to a right turning direction indicated by a dashed-dotted line arrow 50, as illustrated in FIG. 1.

Even in the automated driving, the driver who manages the travel of the automobile 1 is to turn his/her attention to an object outside the automobile 1 by directing the face or line of sight in the traveling direction of the automobile 1 for safety travel of the automobile 1. When the automobile 1 travels in the straight advancing direction as indicated by the broken-line arrow 40 in FIG. 1, for example, the driver is to direct the face or line of sight in the straight advancing direction as indicated by a broken-line arrow 41 in FIG. 1. When the automobile 1 turns right as indicated by the dashed-dotted line arrow 50 in FIG. 1, for example, the driver is to direct the face or line of sight in a right-front direction as seen from the automobile 1, as indicated by a dashed-dotted line arrow 51 in FIG. 1.

Herein, it is proposed to reproduce a sound source as a stereophonic sound image having an original localization position with speakers disposed in the vehicle compartment 3 of the automobile 1. In FIG. 1, a right-front speaker 11, a left-front speaker 12, a right-rear speaker 13, and a left-rear speaker 14 are illustrated as non-limiting examples of the speakers. Note that the stereophonic sound image having the original localization position of the sound source may be generated with at least two or more speakers disposed in the automobile 1. In this example illustrated in FIG. 1, the right-front speaker 11 and the left-front speaker 12 may be disposed in front of the driver's seat 4 of the automobile 1.

Although depending on the type of the stereophonic sound image reproducing system, a sound reproduced as a stereophonic sound image may be localizable in a 360-degree direction that surrounds the automobile 1. For example, the stereophonic sound image may be localized at any of first to eighth localization positions P1 to P8 as illustrated in FIG. 1. In FIG. 1, X, Y, and Z-axis directions orthogonal to one another are indicated. The X-axis direction may correspond to a lateral direction or a width direction of the automobile 1, and the Y-axis direction may correspond to a longitudinal direction of the automobile 1. The Z-axis direction may correspond to a vertical direction of the automobile 1.

As described above, the sound reproduced as the stereophonic sound image may be localized at not only any of the first localization position P1, the second localization position P2, and the eighth localization position P8 on the front side of the automobile 1 but also any of: the fourth localization position P4, the fifth localization position P5, and the sixth localization position P6 on the rear side of the automobile 1; the third localization position P3 on the right side of the automobile; and the seventh localization position P7 on the left side of the automobile 1.

For convenience of illustration in FIG. 1, the first to eighth localization positions P1 to P8 are arranged in an annular form so as to surround the exterior of the vehicle body 2 of the automobile 1. However, actual localization positions generated by the stereophonic sound image reproducing system 10 may be located in a space inward of the speakers 11 to 14 that are disposed in the vehicle compartment 3 of the automobile 1, in many cases. It may thus be understood that the localization positions illustrated in FIG. 1 are mappings of the localization positions located in the space inward of the speakers 11 to 14.

The occupant such as the driver in the automobile 1 is prone to turn his/her attention toward the localization position of the stereophonic sound image.

As a result, the occupant such as the driver can direct the line of sight in the rear direction that is opposite to the traveling direction of the automobile 1. For example, the occupant such as the driver may direct the face or line of sight toward the sound image localized at the sixth localization position P6 located behind the driver to clearly recognize the sound image, as indicated by a solid-line arrow 70 in FIG. 1.

It is therefore desired that the stereophonic sound image reproducing system 10 suppresses, when being applied to the automobile 1, excessive behavior of the driver caused by a sound image localized at a position in the vehicle compartment 3 of the automobile 1.

Figure 2:
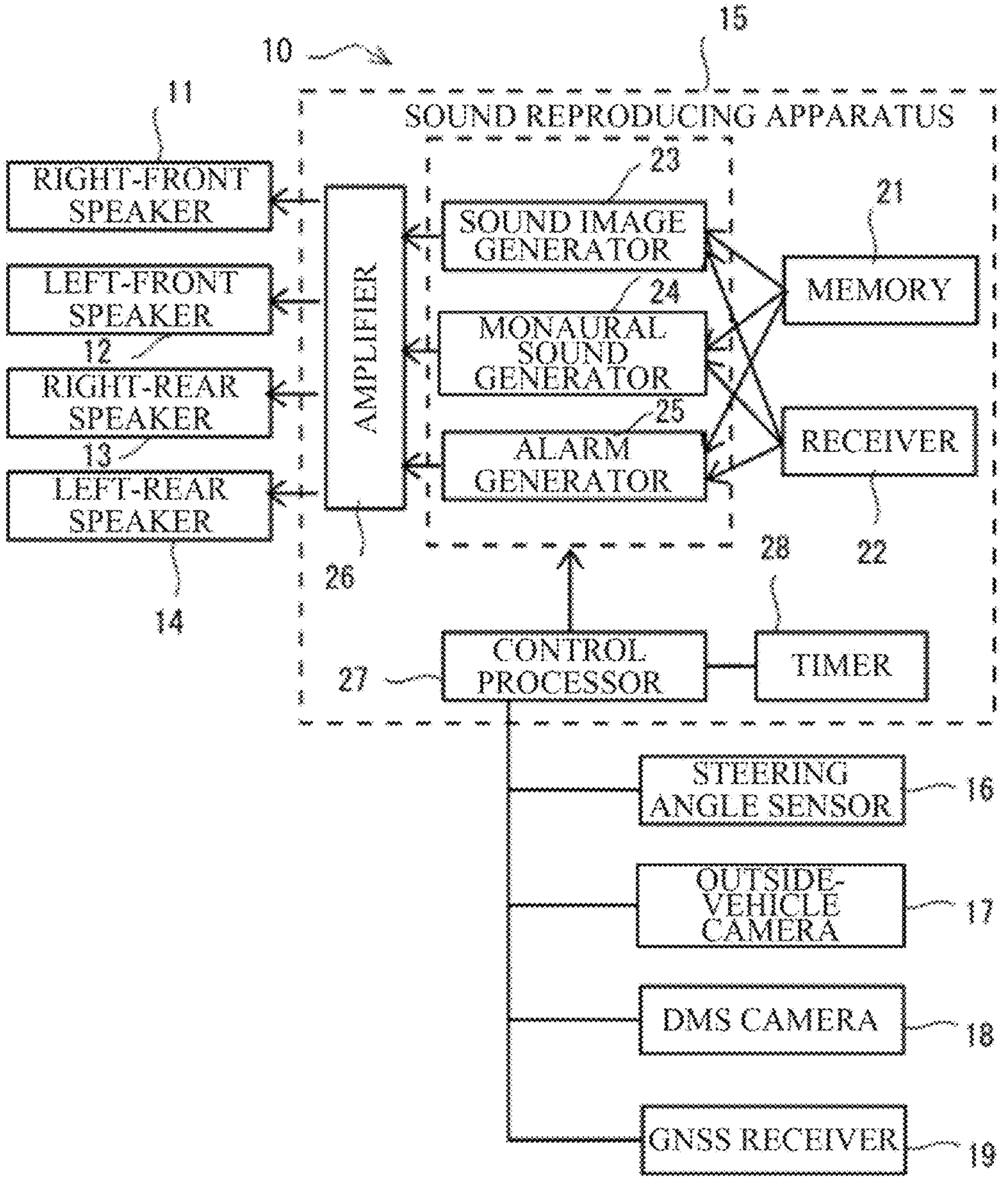
FIG. 2 is a block diagram illustrating an exemplary configuration of the stereophonic sound image reproducing system to be applied to the automobile illustrated in FIG. 1.

FIG. 2 is a block diagram illustrating an exemplary configuration of the stereophonic sound image reproducing system 10 to be applied to the automobile 1 illustrated in FIG. 1.

The stereophonic sound image reproducing system 10 illustrated in FIG. 2 includes the right-front speaker 11, the left-front speaker 12, the right-rear speaker 13, the left-rear speaker 14, and a sound reproducing apparatus 15.

The sound reproducing apparatus 15 may include a memory 21, a receiver 22, a sound image generator 23, a monaural sound generator 24, an alarm generator 25, an amplifier 26, and a control processor 27. A timer 28 and vehicle sensors disposed in the automobile 1 may be coupled to the control processor 27. Non-limiting examples of the vehicle sensors disposed in the automobile 1 may include a steering angle sensor 16, an outside-vehicle camera 17, a driver monitoring system (DMS) camera 18, and a global navigation satellite system (GNSS) receiver 19, as illustrated in FIG. 2.

The memory 21 in the sound reproducing apparatus 15 may store, for example, transform function data for generation of a stereophonic sound image from reproduced sound data on various sound sources, such as reproduced sound data on a monaural sound source.

Non-limiting examples of the reproduced sound data on various sound source may include monaural reproduced sound data, stereophonic reproduced sound data including an original localization position in a sound source itself, and reproduced sound data generated by a multi-channel method other than a stereophonic method. The monaural reproduced sound data, which is not stereophonically generated, may include data on the original localization position at which a stereophonic sound image is to be localized based on its sound source.

Further, the reproduced sound data on various sound sources may be sound data including reproducible contents or voice data for route guidance, for example.

The receiver 22 may receive, as the reproduced sound data on the sound source, notification sound data from road markers such as beacons disposed on a road on which the automobile 1 travels, for example.

Non-limiting examples of the notification sound may include pinpoint sounds that remind the occupant such as the driver of the presence of intersections and caution zones on the road.

Further, the receiver 22 may receive, as the reproduced sound data on the sound source, voice data for wide-area road guidance, sound data including reproducible contents, or data on a call with another person via a base station, for example. The reproduced sound data on the sound source receivable by the receiver 22 may differ depending on a function or service of the receiver 22.

The reproduced sound data on the sound source received by the receiver 22 may include the data on the original localization position of the sound source.

The sound image generator 23 may generate a sound reproducing signal adapted to reproduce the reproduced sound data on the sound source received from the memory 21 or the receiver 22 as a stereophonic sound image localized at the original localization position of the sound source of the reproduced sound data. The sound image generator 23 may output the sound reproducing signal to the right-front speaker 11, the left-front speaker 12, the right-rear speaker 13, and the left-rear speaker 14 via the amplifier 26. In this manner, the stereophonic sound image having the original localization position of the sound source of the reproduced sound data may be generated in the vehicle compartment 3 of the automobile 1, as illustrated in FIG. 1.

When receiving, for example, the reproduced sound data on a monaural sound source including no original localization therein, the sound image generator 23 may convert the sound source with the transform function data acquired from the memory 21 to generate the sound reproducing signal which is to be outputted to each of the speakers 11 to 14.

In contrast, when receiving, for example, the reproduced sound data on a stereophonic sound source including the original localization therein, the sound image generator 23 may generate the sound reproducing signal including the original localization position of the sound source as it is.

As described above, the sound image generator 23 is configured to generate a sound image localizable at least in the longitudinal direction of the automobile 1 with the speakers 11 to 14.

In some embodiments, the sound image generator 23 may generate a stereophonic sound image localized at a desired position based on the sound source of the reproduced sound data by selecting the transform function data for sound image generation in accordance with the localization position included in the reproduced sound data. In other words, the sound image generator 23 may generate stereophonic sound images localized at different localization positions, based on the same sound source of the reproduced sound data by changing the transform function data for sound image generation. For example, the sound image generator 23 may generate a stereophonic sound image localized at the first localization position P1 and a stereophonic sound image localized at the fifth localization position P5, based on the same sound source of the reproduced sound data. For this purpose, the memory 21 may store different pieces of the transform function data for the respective localization positions including at least the first to eighth localization positions P1 to P8 illustrated in FIG. 1, for example.

In one example, the sound image generator 23 may acquire a transform function data adapted to change a sound image localized at the first localization position P1 to a sound image localized at the eighth localization position P8 from: the transform function data adapted to localize the reproduced sound data on the monaural sound source including no localization position of a stereophonic sound image therein at the first localization position P1; and the transform function data adapted to localize the reproduced sound data on the monaural sound source including no localization position of a stereophonic sound image therein at the eighth localization position P8. Using the transform function data adapted to change the localization positions, the sound image generator 23 may generate, from the reproduced sound data on the stereophonic sound source including the original localization therein, a stereophonic sound image localized at a localization position different from the original localization position.

In another example, the sound image generator 23 may convert stereophonic reproduced sound data including an original localization in its sound source itself into reproduced sound data on a monaural sound source, and convert the reproduced sound data on the monaural sound source obtained as a result of the conversion with the transform function data corresponding to a desired localization position. In this manner, the sound image generator 23 may generate a stereophonic sound image localized at the desired position different from the original localization position.

As described above, the sound image generator 23 may generate the stereophonic sound image localized at the desired position by changing the transform function data for sound image generation in accordance with the information included in the reproduced sound data, regardless of the presence of the localization position included in the sound source of the reproduced sound data. For example, the sound image generator 23 may generate a sound image localizable at least in the longitudinal direction of the automobile 1 with the speakers 11 to 14. The memory 21 may store the different pieces of the transform function data for the respective localization positions including at least the first to eighth localization positions P1 to P8 illustrated in FIG. 1, for example.

The transform function data that the sound image generator 23 uses to generate a stereophonic sound image from the reproduced sound data may be, when, for example, used for the reproduced sound data on the monaural sound source, a transfer function representing sound transmission in a virtual space in which a sound source and a driver's dummy head are located. For example, the sound source may be located at the fifth localization position P5, and the dummy head may be located on the driver's seat 4, in the virtual space corresponding to FIG. 1. In this example, a transfer function for a right ear may be obtained from a sound source waveform and a hearing sound waveform in the right ear of the dummy head. Likewise, a transfer function for a left ear may be obtained from the sound source waveform and a hearing sound waveform in the left ear of the dummy head. These transfer functions may be used to change the sound source waveform to right and left hearing sound waveforms. The transfer function for the right ear and the transfer function for the left ear may be used as transform function data adapted to convert the reproduced sound data on the monaural sound source into a stereophonic sound image localized at the fifth localization position P5, for example. In practice, the transform function data may be further adjusted in accordance with the position of the speaker in the automobile 1.

In some embodiments, the sound image generator 23 may select transform function data corresponding to the localization position indicated by instruction data included in the reproduced sound data from the pieces of the transform function data for the respective localization positions illustrated in FIG. 1. In one example, the sound image generator 23 may select transform function data preliminarily determined in accordance with the type of the reproduced sound data from the pieces of the transform function data stored in the memory 21.

As for the reproduced sound data for right-turning route guidance, for example, the sound image generator 23 may select transform function data corresponding to the second localization position P2 or the third localization position P3 so that a sound image is localized at a position on the right side of the automobile 1.

In some embodiments, the reproduced sound data may include instruction data indicating a localization position of a sound to be generated. For example, the notification sound data obtained from a road marker may include data on GNSS coordinates of the position of the road marker at which a notification sound of the road marker is to be localized. In this case, the sound image generator 23 may select the transform function data based on a relative direction and a relative distance between a current position of the automobile 1 and the position of the road marker so that the notification sound is localized at the position of the road marker relative to the automobile 1.

As for the reproduced sound data having been stereophonically reproduced in advance, the sound image generator 23 may use or may not use the transform function data acquired from the memory 21. Non-limiting examples of the reproduced sound data having been stereophonically reproduced in advance may include stereophonic reproduced sound data, 22.2 multi-channel reproduced sound data, and binaural reproduced sound. The sound image generator 23 may switch the use of the transform function data between when the reproduced sound data received from the memory 21 or the receiver 22 is the reproduced sound data stereophonically generated and when the reproduced sound data received from the memory 21 or the receiver 22 is the reproduced sound data not stereophonically generated.

Note that, when the original localization position of the reproduced sound data having been stereophonically reproduced in advance is to be changed, the sound image generator 23 may select the transform function data and change the localization position of the reproduced sound data having been stereophonically reproduced in advance with the selected transform function data. In this case, the sound image generator 23 may convert the sound source of the reproduced sound data having been stereophonically reproduced in advance into a monaural sound source once, and then convert the monaural sound source with the transform function data acquired from the memory 21 and adapted to localize the sound data at a desired position, for example. In this manner, the sound image generator 23 may change the localization position of the sound image to be generated in the vehicle compartment 3 of the automobile 1 from the original localization position of the reproduced sound data having been stereophonically reproduced in advance to another localization position. The sound image generator 23 may convert the reproduced sound data stereophonically reproduced in advance into the monaural sound data with the monaural sound generator 24.

The monaural sound generator 24 may convert the reproduced sound data acquired from the memory 21 or the receiver 22 into a monaural sound to thereby generate a sound reproducing signal. The reproduced sound data before the conversion may be monaural reproduced sound data or reproduced sound data having been reproduced in advance by a stereophonic system or the like. The monaural sound generator 24 may generate the reproduced sound data on the monaural sound source by combining all the waveforms included in the reproduced sound data having been stereophonically reproduced in advance. The monaural sound generator 24 may output the sound reproducing signal to the right-front speaker 11, the left-front speaker 12, the right-rear speaker 13, and the left-rear speaker 14 via the amplifier 26. Note that the monaural sound generator 24 may output a significant sound reproducing signal to some of the speakers 11 to 14, and may output an anacoustic sound reproducing signal to the remaining speakers. For example, the monaural sound generator 24 may output the significant sound reproducing signal to the right-front speaker 11 and the left-front speaker 12, and may output the anacoustic sound reproducing signal to the right-rear speaker 13 and the left-rear speaker 14.

The alarm generator 25 may generate an alarm sound reproducing signal from the reproduced sound data for alarm use acquired from the memory 21. The reproduced sound data for alarm use may be a monaural sound source. The alarm generator 25 may output the alarm sound reproducing signal to the right-front speaker 11, the left-front speaker 12, the right-rear speaker 13, and the left-rear speaker 14 via the amplifier 26. Note that the alarm generator 25 may output a significant alarm sound reproducing signal to some of the speakers 11 to 14, and may output an anacoustic alarm sound reproducing signal to the remaining speakers. For example, the alarm generator 25 may output the significant alarm sound reproducing signal to the right-front speaker 11 and the left-front speaker 12, and may output the anacoustic alarm sound reproducing signal to the right-rear speaker 13 and the left-rear speaker 14.

The sound image generator 23, the monaural sound generator 24, the alarm generator 25, the right-front speaker 11, the left-front speaker 12, the right-rear speaker 13, and the left-rear speaker 14 may be coupled to the amplifier 26. The amplifier 26 may amplify the sound reproducing signal generated by the sound image generator 23, the monaural sound generator 24, or the alarm generator 25, and may output the amplified signal to the right-front speaker 11, the left-front speaker 12, the right-rear speaker 13, and the left-rear speaker 14.

The timer 28 may measure an elapsed time and a time of day.

The control processor 27 may control an operation of the sound reproducing apparatus 15. The control processor 27 may be a central processing unit (CPU), for example. In this case, the CPU may serve as the control processor 27 of the sound reproducing apparatus 15 by loading and executing a program stored in the memory 21. The control processor 27 may select one of the sound image generator 23, the monaural sound generator 24, and the alarm generator 25, and may cause the selected one to operate. In this manner, the sound reproducing apparatus 15 may cause the sound image generator 23 to generate the stereophonic sound image localized at the original localization position of the sound source of the reproduced sound data in the vehicle compartment 3 of the automobile 1, or may cause the monaural sound generator 24 or the alarm generator 25 to generate a sound in the vehicle compartment 3 of the automobile 1. In one example, the control processor 27 may instruct the sound reproducing apparatus 15 to switch the transform function data so that the localization position of the stereophonic sound image to be generated by the sound reproducing apparatus 15 is changed.

Note that the CPU may implement not only the control processor 27 but also the sound image generator 23, the monaural sound generator 24, or the alarm generator 25 in the sound reproducing apparatus 15 by executing programs.

The steering angle sensor 16 may detect steering angles of the steered wheels of the automobile 1. The steered wheels may be the right-front wheel 5 and the left-front wheel 6, for example. When the steered wheels are steered from the straight advancing direction, the automobile 1 may turn right or left in accordance with a steering direction or a steering amount. The steering angle sensor 16 may detect the steering direction and the steering amount as data indicating the traveling direction of the automobile 1.

The outside-vehicle camera 17 may capture an image of an environment outside the automobile 1. The outside-vehicle camera 17 may be a stereo camera, a monocular camera, or a 360-degree camera, for example. In one example, the automobile 1 may be provided with a plurality of stereo cameras or a plurality of monocular cameras. The outside-vehicle camera 17 may capture an image of an area around the automobile 1 including an area in front of the automobile 1. The image captured by the outside-vehicle camera 17 may include an image of a road extending in the traveling direction of the automobile 1. The outside-vehicle camera 17 may capture an image of the environment outside the automobile 1 as the data indicating the traveling direction of the automobile 1.

The DMS camera 18 may capture an image of the driver in the automobile 1. In one example, the DMS camera 18 may further capture an image of an occupant other than the driver in the automobile 1. The image captured by the DMS camera 18 may include an image of the face and eyes of the driver, for example. The DMS camera 18 may capture an image of the face and eyes of the driver as data indicating a facial direction or a line-of-sight direction of the driver in the automobile 1.

The data indicating the facial direction or the line-of-sight direction of the driver in the automobile 1 may be detected by a vehicle sensor other than the DMS camera 18. Non-limiting examples of the vehicle sensor may include a rear camera of a drive recorder disposed in the vehicle compartment 3 of the automobile 1.

The data indicating the traveling direction of the automobile 1 may be detected by a vehicle sensor other than the steering angle sensor 16 and the outside-vehicle camera 17. Non-limiting examples of the vehicle sensor may include a three axial (X, Y, and Z-axial) acceleration sensor and a gyroscope sensor.

The GNSS receiver 19 may receive electric waves from GNSS satellites to generate a current position of the automobile 1 and a current time of day.

Figure 3:
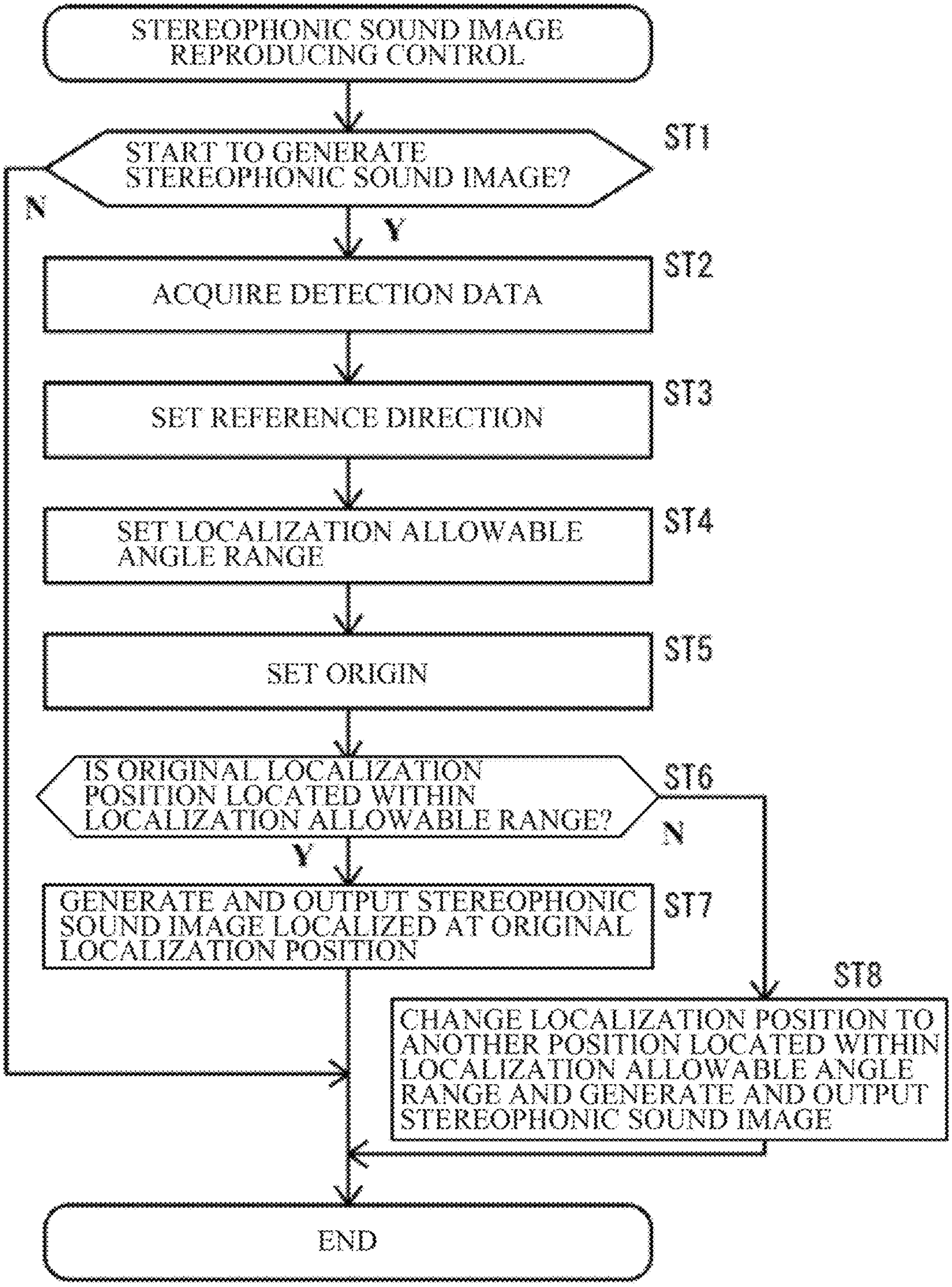
FIG. 3 is a flowchart of stereophonic sound image reproducing control to be executed by a control processor of a sound reproducing apparatus illustrated in FIG. 2.

FIG. 3 is a flowchart of stereophonic sound image reproducing control to be executed by the control processor 27 of the sound reproducing apparatus 15 illustrated in FIG. 2.

The control processor 27 of the sound reproducing apparatus 15 may repeatedly execute the stereophonic sound image reproducing control described in FIG. 3.

In Step ST1, the control processor 27 may determine whether generation of a stereophonic sound image is to be started.

In one example, the control processor 27 may determine that the generation of a stereophonic sound image is to be started when voice data for route guidance is to be reproduced during the travel of the automobile 1.

In another example, the control processor 27 may determine that the generation of a stereophonic sound image is to be started when an instruction to reproduce the reproduced sound data on stereophonic contents is issued by the occupant.

In another example, the control processor 27 may determine that the generation of a stereophonic sound image is to be started when the receiver 22 receives the notification sound data.

In another example, the control processor 27 may determine that the generation of a stereophonic sound image is to be started when the receiver 22 receives the data on a call with another person.

When determining that the generation of a stereophonic sound image is to be started (Step ST1: Y), the control processor 27 may cause the process to proceed to Step ST2 to make a determination based on the facial direction or the line-of-sight direction of the driver detected before starting the generation of a stereophonic sound image localized at the original localization position of the sound source of the reproducing sound data.

In contrast, when determining that the generation of a stereophonic sound image is not to be started (Step ST1: N), the control processor 27 may end the control.

In Step ST2, the control processor 27 may acquire detection data detected by the vehicle sensors.

For example, the control processor 27 may acquire the detection data detected by the steering angle sensor 16, the outside-vehicle camera 17, and the DMS camera 18.

In Step ST3, the control processor 27 may set a reference direction serving as a reference for a determination of a localization position of a sound image.

In one example, the control processor 27 may set, as the reference direction, the facial direction or the line-of-sight direction of the driver in the automobile 1 detected by the DMS camera 18 before the sound image is started to be generated.

In another example, the control processor 27 may set, as the reference direction, a traveling direction of the automobile 1 detected by the steering angle sensor 16 before the sound image is started to be generated.

In another example, the control processor 27 may set, as the reference direction, an extending direction of the road on which the automobile 1 is traveling and which is detected by the outside-vehicle camera 17 before the sound image is started to be generated. Herein, the extending direction of the road may be the traveling direction of the automobile 1.

In another example, when the facial direction or the line-of-sight direction of the driver is deviated from the traveling direction of the automobile 1 by a threshold angle or greater, the control processor 27 may set a direction therebetween (e.g., a center direction therebetween) as the reference direction.

In another example, when the facial direction or the line-of-sight direction of the driver is deviated from the extending direction of the road on which the automobile 1 is traveling by a threshold angle or greater, the control processor 27 may set a direction therebetween (e.g., a center direction therebetween) as the reference direction.

In Step ST4, the control processor 27 may set a localization allowable angle range for the determination of a localization position of a sound image.

The control processor 27 may set a predetermined angle range extending from the reference direction in the lateral direction of the automobile 1 as the localization allowable angle range. For example, the predetermined angle range may extend from the reference direction at an angle of 80 degrees in each of the right and left directions of the automobile 1 so as to define an angle of 160 degrees as a whole.

In one example, the localization allowable angle range may be set such that the traveling direction of the automobile 1 is included in a field of view of the driver even when the driver directs the face or line of sight toward the localization position of the stereophonic sound image reproduced. For example, the localization allowable angle range may be set so as to have an angle of 180 degrees at most to prevent the driver from directing the face or line of sight in the rear direction even when the driver directs the face or line of sight toward the localization position of the stereophonic sound image.

Note that, the localization allowable angle range may be expanded or narrowed depending on a traveling status, such as a vehicle speed or a steering amount, of the automobile 1. When the vehicle speed is higher than or equal to a threshold, for example, the control processor 27 may set a smaller localization allowable angle range than that to be set when the vehicle speed is lower than the threshold.

In Step ST5, the control processor 27 may set an origin 45 for the determination of the localization position of the sound image.

Figure 4:
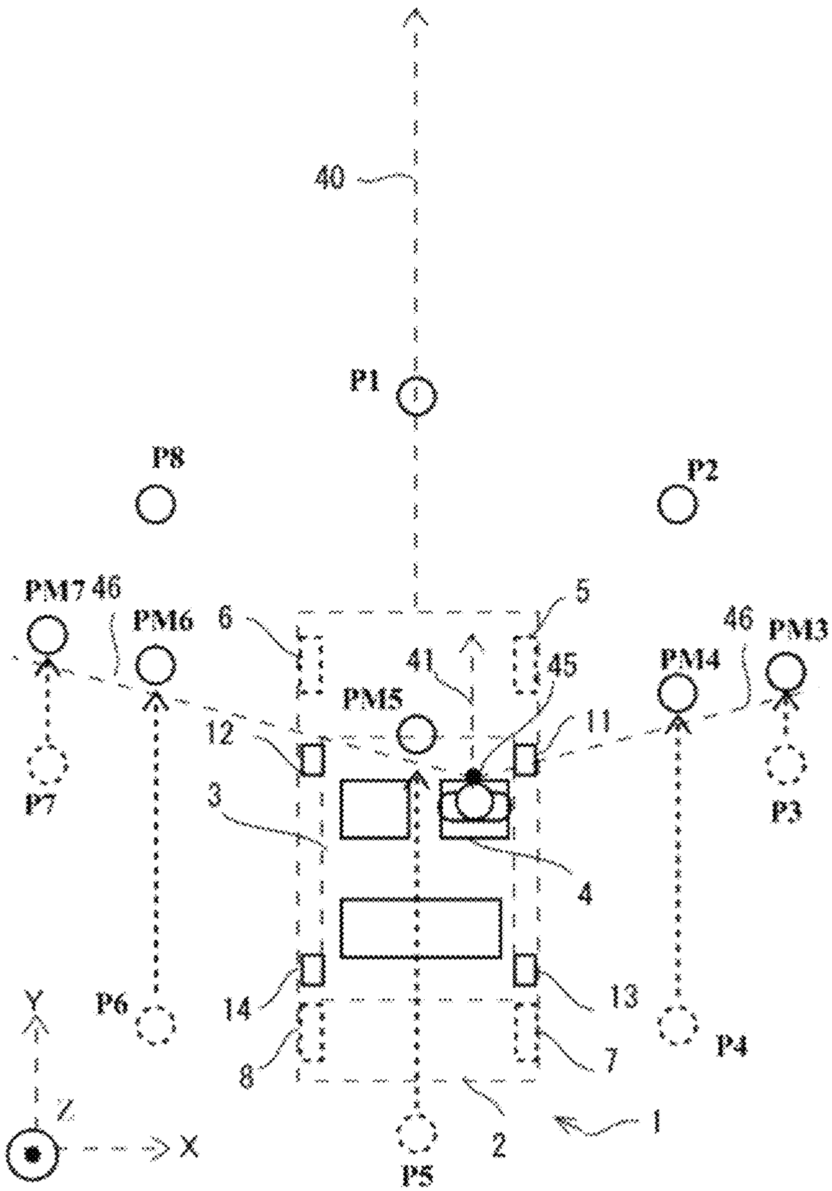
FIG. 4 is an explanatory diagram illustrating an exemplary state of generation of a stereophonic sound image under the stereophonic sound image reproducing control illustrated in FIG. 3 during straight travel of the automobile.

In some embodiments, the control processor 27 may set a central position of a frontal end of the driver's seat 4 of the automobile 1 as the origin 45 of the localization allowable angle range, as illustrated in FIG. 4.

In some embodiments, a central position of a frontal end of the automobile 1 may be set as the origin 45 of the localization allowable angle range.

In Step ST6, the control processor 27 may determine whether the original localization position of the sound image to be generated is located inside the localization allowable angle range.

The original localization position of the sound image to be generated may be specified by the reproduced sound data itself or information in the reproduced sound data.

The control processor 27 may determine whether the original localization position of the sound image to be generated is located within the localization allowable angle range having the origin 45 at the central position of the front end portion of the driver's seat 4 as illustrated in FIG. 4.

When the original localization position of the reproduced sound data is located within the localization allowable angle range (Step ST6: Y), the control processor 27 may cause the process to proceed to Step ST7 to generate the sound image localized at the original localization position of the sound source of the reproduced sound data.

In contrast, when the original localization position of the reproduced sound data is not located within the localization allowable angle range (Step ST6: N), the control processor 27 may cause the process to proceed to Step ST8 without starting to generate the sound image localized at the original localization position of the sound source of the reproduced sound data.

In Step ST7, the control processor 27 may start a process in which the sound image to be generated is reproduced and outputted as the sound image localized at the original localization position of the reproduced sound data.

The control processor 27 may cause the sound image generator 23 to reproduce the sound image to be generated. Based on the sound image to be generated, the sound image generator 23 may generate the sound reproducing signal adapted to generate the sound image localized at the original localization position of the sound source of the reproduced sound data. The sound image generator 23 may output the sound reproducing signal to the right-front speaker 11, the left-front speaker 12, the right-rear speaker 13, and the left-rear speaker 14 via the amplifier 26. In this manner, the sound image generator 23 may start to generate the sound image localized at the original localization position of the sound source of the reproduced sound data in the vehicle compartment 3. In one example, a stereophonic sound image having the original localization position of the reproduced sound data may be generated in the vehicle compartment 3 of the automobile 1.

Thereafter, the control processor 27 may end the control.

In Step ST8, the control processor 27 may start a process in which the localization position of the sound image to be generated is changed from the original localization position to another localization position, and the reproduced sound data is reproduced and outputted at the other localization position.

The control processor 27 may change the localization position of the sound image to another localization position located within the localization allowable angle range and cause the sound image generator 23 to reproduce the reproduced sound data as the sound image localized at the other localization position. For example, the sound image generator 23 may generate the sound reproducing signal based on: the sound image to be generated; and the transform function data adapted to localize the reproduced sound data at a position within the localization allowable angle range. The sound image generator 23 may output the sound reproducing signal to the right-front speaker 11, the left-front speaker 12, the right-rear speaker 13, and the left-rear speaker 14 via the amplifier 26. In this manner, the sound image generator 23 may start to generate a sound image localized at a position within the localization allowable angle range. In one example, a stereophonic sound image localized at a position within the localization allowable angle range may be generated in the vehicle compartment 3 of the automobile 1.

Thereafter, the control processor 27 may end the control.

As described above, when the original localization position of the sound image starting to be generated is determined not to be located within the localization allowable angle range, the control processor 27 refrains from generating the sound image localized at the original localization position of the sound source of the reproduced sound data with the sound image generator 23.

When refraining from generating the sound image localized at the original localization position of the sound source of the reproduced sound data with the sound image generator 23, the control processor 27 may change the localization position of the sound image to another localization position located within the localization allowable angle range, and cause the sound image generator 23 to generate the sound image localized at the other localization position. In this manner, even when the sound source is not reproduced as the sound image localized at the original localization position of the sound source, the sound source may be reproduced as the sound image localized at the localization position other than the original localization position and may be heard by the occupant such as the driver in the automobile 1.

When the localization position of the sound image is changed to the other localization position located within the localization allowable angle range and the sound image generator 23 starts to generate a sound image localized at the other localization position, for example, a localized sound image may be generated. Since the localized sound image is generated even when the sound image localized at the original localization position of the sound source of the reproduced sound data is not generated, it is expected that the occupant such as the driver in the automobile 1 becomes less prone to feel strange to the reproduced sound.

Further, the localization position of the sound image is set so as to be located within the localization allowable angle range extending from the reference direction. The reference direction is determined based on the facial direction of the driver, the line-of-sight direction of the driver, or the traveling direction of the automobile 1 that is detected before the sound image is generated. Accordingly, even if the driver turns his/her attention to the localization position of the sound image when the automobile 1 is traveling, the facial direction or the line-of-sight direction is less likely to be largely deviated from the traveling direction of the automobile 1. This allows the driver to easily keep directing the face to the front side of the automobile 1, and thus helps to prevent the driver from making inattentive driving due to the sound image localized at the original localization position of the sound source of the reproduced sound data.

Next, a description is given of an exemplary state of the generation of a stereophonic sound image under the stereophonic sound image reproducing control described above.

FIG. 4 is an explanatory diagram illustrating an exemplary state of the generation of a stereophonic sound image under the stereophonic sound image reproducing control illustrated in FIG. 3 during straight travel of the automobile 1.

In FIG. 4, the central position of the frontal end of the driver's seat 4 is set as the origin 45, and a localization allowable angle range 46 is indicated by broken lines extending from the origin 45.

In this example, the first localization position P1, the second localization position P2, and the eighth localization position P8 that are illustrated also in FIG. 1 are located within the localization allowable angle range 46. When the original localization position of the sound source of the reproduced sound data is located at any of these localization positions, the control processor 27 may determine that the original localization position of the reproduced sound data is located within the localization allowable angle range 46 (Step ST6: Y). Thereafter, in Step ST7, the control processor 27 may generate a stereophonic sound image localized at the original localization position of the reproduced sound data based on the reproduced sound data.

In contrast, when the original localization position of the reproduced sound data is located at any of the third localization position P3, the fourth localization position P4, the fifth localization position P5, the sixth localization position P6, and the seventh localization position P7, the control processor 27 may determine that the original localization position is not located within the localization allowable angle range 46 (Step ST6: N). Thereafter, in Step ST8, the control processor 27 may change the localization position of the reproduced sound data to another localization position located within the localization allowable angle range 46 and generate a stereophonic sound image based on the reproduced sound data.

When the original localization position of the reproduced sound data is the third localization position P3, for example, the control processor 27 may change the localization position of the reproduced sound data to a third modified localization position PM3 and generate a stereophonic sound image based on the reproduced sound data. The third modified localization position PM3 may be set by moving the third localization position P3 forward to a position located within the localization allowable angle range 46.

Likewise, when the original localization position of the reproduced sound data is the fourth localization position P4, the control processor 27 may change the localization position of the reproduced sound data to a fourth modified localization position PM4 and generate a stereophonic sound image based on the reproduced sound data. The fourth modified localization position PM4 may be set by moving the fourth localization position P4 forward to a position located within the localization allowable angle range 46.

Likewise, when the original localization position of the reproduced sound data is the fifth localization position P5, the control processor 27 may change the localization position of the reproduced sound data to a fifth modified localization position PM5 and generate a stereophonic sound image based on the reproduced sound data. The fifth modified localization position PM5 may be set by moving the fifth localization position P5 forward to a position located within the localization allowable angle range 46.

Likewise, when the original localization position of the reproduced sound data is the sixth localization position P6, the control processor 27 may change the localization position of the reproduced sound data to a sixth modified localization position PM6 and generate a stereophonic sound image based on the reproduced sound data. The sixth modified localization position PM6 may be set by moving the sixth localization position P6 forward to a position located within the localization allowable angle range 46.

Likewise, when the original localization position of the reproduced sound data is the seventh localization position P7, the control processor 27 may change the localization position of the reproduced sound data to a seventh modified localization position PM7 and generate a stereophonic sound image based on the reproduced sound data. The seventh modified localization position PM7 may be set by moving the seventh localization position P7 forward to a position located within the localization allowable angle range 46.

In this manner, the stereophonic sound image actually generated in the vehicle compartment 3 of the automobile 1 based on the reproduced sound data started to be reproduced may be localized within the localization allowable angle range 46.

Figure 5:
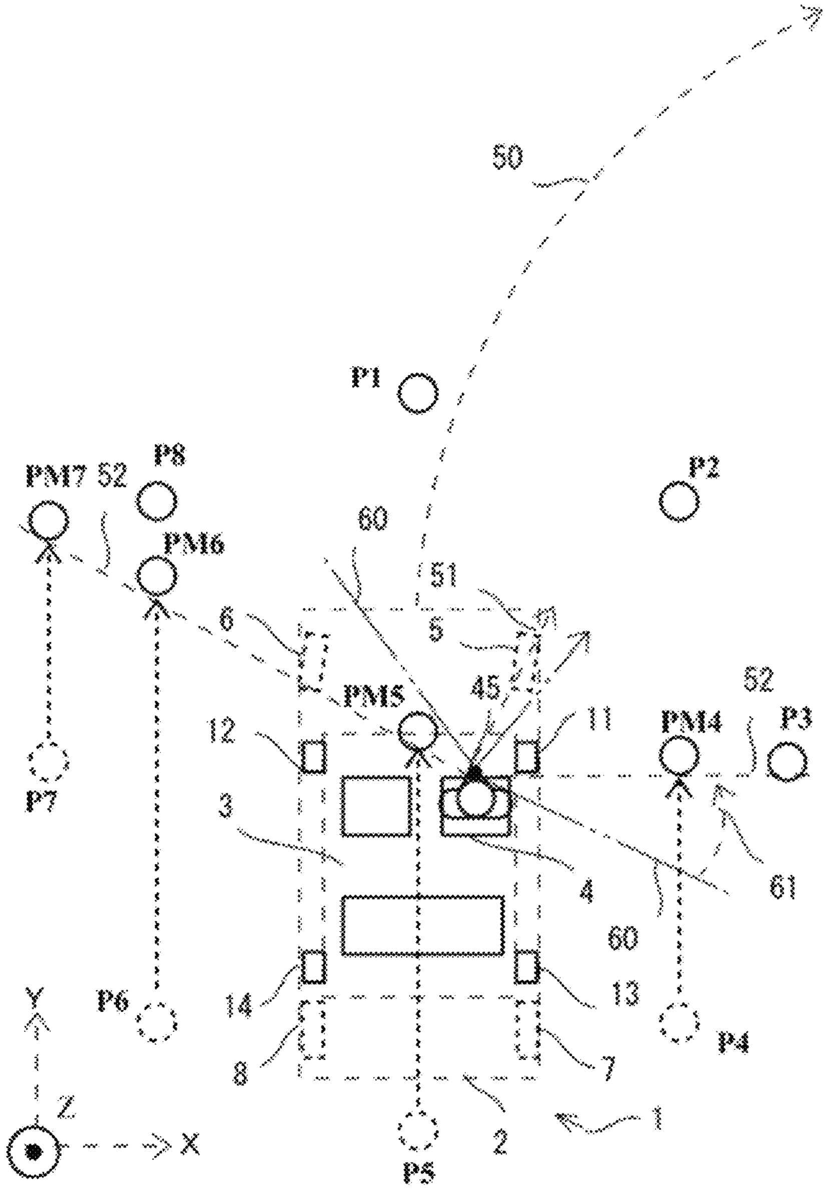
FIG. 5 is an explanatory diagram illustrating an exemplary state of generation of a stereophonic sound image under the stereophonic sound image reproducing control illustrated in FIG. 3 during a right turn of the automobile.

FIG. 5 is an explanatory diagram illustrating an exemplary state of the generation of a stereophonic sound image under the stereophonic sound image reproducing control illustrated in FIG. 3 during a right turn of the automobile 1.

In FIG. 5, the central position of the frontal end of the driver's seat 4 is set as the origin 45, and a localization allowable angle range 52 is indicated by broken lines extending from the origin 45.

In this example, the first localization position P1, the second localization position P2, the third localization position P3, and the eighth localization position P8 that are illustrated also in FIG. 1 are located within the localization allowable angle range 52. When the original localization position of the sound source of the reproduced sound data is located at any of these localization positions, the control processor 27 may determine that the original localization position of the reproduced sound data is located within the localization allowable angle range 52 (Step ST6: Y). Thereafter, in Step ST7, the control processor 27 may generate a stereophonic sound image localized at the original localization position of the reproduced sound data, based on the reproduced sound data.

In contrast, when the original localization position of the reproduced sound data is located at any of the fourth localization position P4, the fifth localization position P5, the sixth localization position P6, and the seventh localization position P7, the control processor 27 may determine that the original localization position of the reproduced sound data is not located within the localization allowable angle range 52 (Step ST6: N). Thereafter, in Step ST8, the control processor 27 may change the localization position of the reproduced sound data to another localization position located within the localization allowable angle range 52 and generate a stereophonic sound image based on the reproduced sound data.

When the original localization position of the reproduced sound data is the fourth localization position P4, for example, the control processor 27 may change the localization position of the reproduced sound data to a fourth modified localization position PM4 and generate a stereophonic sound image based on the reproduced sound data. The fourth modified localization position PM4 may be set by moving the fourth localization position P4 forward to a position located within the localization allowable angle range 52.

Likewise, when the original localization position of the reproduced sound data is the fifth localization position P5, the control processor 27 may change the localization position of the reproduced sound data to a fifth modified localization position PM5 and generate a stereophonic sound image based on the reproduced sound data. The fifth modified localization position PM5 may be set by moving the fifth localization position P5 forward to a position located within the localization allowable angle range 52.

Likewise, when the original localization position of the reproduced sound data is the sixth localization position P6, the control processor 27 may change the localization position of the reproduced sound data to a sixth modified localization position PM6 and generate a stereophonic sound image based on the reproduced sound data. The sixth modified localization position PM6 may be set by moving the sixth localization position P6 forward to a position located within the localization allowable angle range 52.

Likewise, when the original localization position of the reproduced sound data is the seventh localization position P7, the control processor 27 may change the localization position of the reproduced sound data to a seventh modified localization position PM7 and generate a stereophonic sound image based on the reproduced sound data. The seventh modified localization position PM7 may be set by moving the seventh localization position P7 forward to a position located within the localization allowable angle range 52.

In this manner, the stereophonic sound image actually generated in the vehicle compartment 3 of the automobile 1 based on the reproduced sound data started to be reproduced may be localized within the localization allowable angle range 52.

In FIG. 5, the reference direction and another localization allowable angle range 60 are indicated by dashed-two dotted lines.

The localization allowable angle range 60 indicated by the dashed-two dotted lines extends more rightward in the rear direction than the localization allowable angle range indicated by the broken lines. When the automobile 1 is steered more rightward from the state illustrated in FIG. 5, the reference direction and the localization allowable angle range indicated by the broken lines in FIG. 5 may be shifted more rightward as indicated by the dashed-two dotted lines in FIG. 5.

When the localization allowable angle range is largely shifted in the rear direction as described above, the control processor 27 of the sound reproducing apparatus 15 may narrow the localization allowable angle range as a result of the determination in Step ST6.

In some embodiments, when a part of the localization allowable angle range is located rearward of the width direction of the automobile 1, the control processor 27 may set the remaining part of the localization allowable angle range that is located forward of the width direction of the automobile 1 and that excludes the part located rearward of the width direction of the automobile 1 as the localization allowable angle range, as indicated by a broken-line arrow 61 in FIG. 5.

This helps to prevent the stereophonic sound image from being localized at a position rearward of the width direction of the automobile 1. The driver is thus prevented from looking back even when directing the face or line of sight toward the localization position of the stereophonic sound image.

In the first example embodiment described above, the sound reproducing apparatus 15 includes the sound image generator 23 configured to generate, with the speakers 11 to 14, a sound image localizable at least in the longitudinal direction of the automobile 1. The sound reproducing apparatus 15 sets the predetermined angle range extending from the reference direction of the automobile 1 in the lateral direction of the automobile 1 as the localization allowable angle range. The reference direction is the facial direction of the driver of the automobile 1, the line-of-sight direction of the driver, the traveling direction of the automobile 1, the direction between the facial direction of the driver and the traveling direction of the automobile 1, or the direction between the line-of-sight direction of the driver and the traveling direction of the automobile 1 that is detected by the vehicle sensors before the sound image generator 23 starts to generate the sound image localized at the original localization position of the sound source of the reproduced sound data.

In some embodiments, the sound reproducing apparatus 15 may set the position of the driver's seat 4 in the automobile 1 as the origin 45 of the localization allowable angle range. The sound reproducing apparatus 15 may be thus configured to determine whether the localization position of the sound image to be generated is located within the localization allowable angle range, based on the position of the driver who manages the travel of the automobile 1.

In some embodiments, the sound reproducing apparatus 15 may set the angle range extending forward of the width direction of the automobile 1 as the localization allowable angle range. This helps to prevent the driver of the automobile 1 from directing the face or line of sight toward the sound image localized rearward of the width direction of the automobile 1.

After setting the localization allowable range, the sound reproducing apparatus 15 determines whether the localization position of the sound image starting to be generated is located within the localization allowable angle range.

When the original localization position of the sound image starting to be generated is determined to be located within the localization allowable angle range, the sound reproducing apparatus 15 starts to generate, with the sound image generator 23, the sound image localized at the original localization position of the sound source of the reproduced sound data.

In contrast, when the original localization position of the sound image starting to be generated is determined not to be located within the localization allowable angle range, the sound reproducing apparatus 15 refrains from generating, with the sound image generator 23, the sound image localized at the original localization position of the sound source of the reproduced sound data.

According to the first example embodiment described above, the sound image generated in the vehicle compartment 3 of the automobile 1 is prevented from being localized at a position outside the localization allowable angle range defined with reference to the facial direction of the driver, the facial direction of the driver, the line-of-sight direction of the driver, or the traveling direction of the automobile 1.

As a result, even when the driver of the automobile 1 directs the face or line of sight toward the localization position of the sound image, the face or line of sight of the driver is kept within the localization allowable angle range. The localization allowable angle range is the angle range extending in the lateral direction of the automobile 1 from the reference direction which is the facial direction of the driver, the line-of-sight direction of the driver, or the traveling direction of the automobile 1 detected before the generation of the sound image is started. As a result, even when the driver continues to direct the face or line of sight toward the localization position of the sound image, the face or line of sight of the driver is kept within the localization allowable angle range extending forward of the width direction of the automobile 1. This allows the traveling direction of the automobile 1 to be easily kept included in the field of view range of the driver.

According to the first example embodiment described above, it is possible to suppress excessive behavior of the driver caused by a localized sound image.

Second Example Embodiment

The automobile 1 according to a second example embodiment of the disclosure will now be described.

In the second example embodiment, stereophonic sound image reproducing control performed by the control processor 27 of the sound reproducing apparatus 15 may be different from that in the example embodiment described above.

For example, a process to be performed after the original localization position of the reproduced sound data is determined not to be located within the localization allowable angle range in Step ST6 may be different from that in the example embodiment described above.

In the following, the differences from the example embodiment described above are described.

Figure 6:
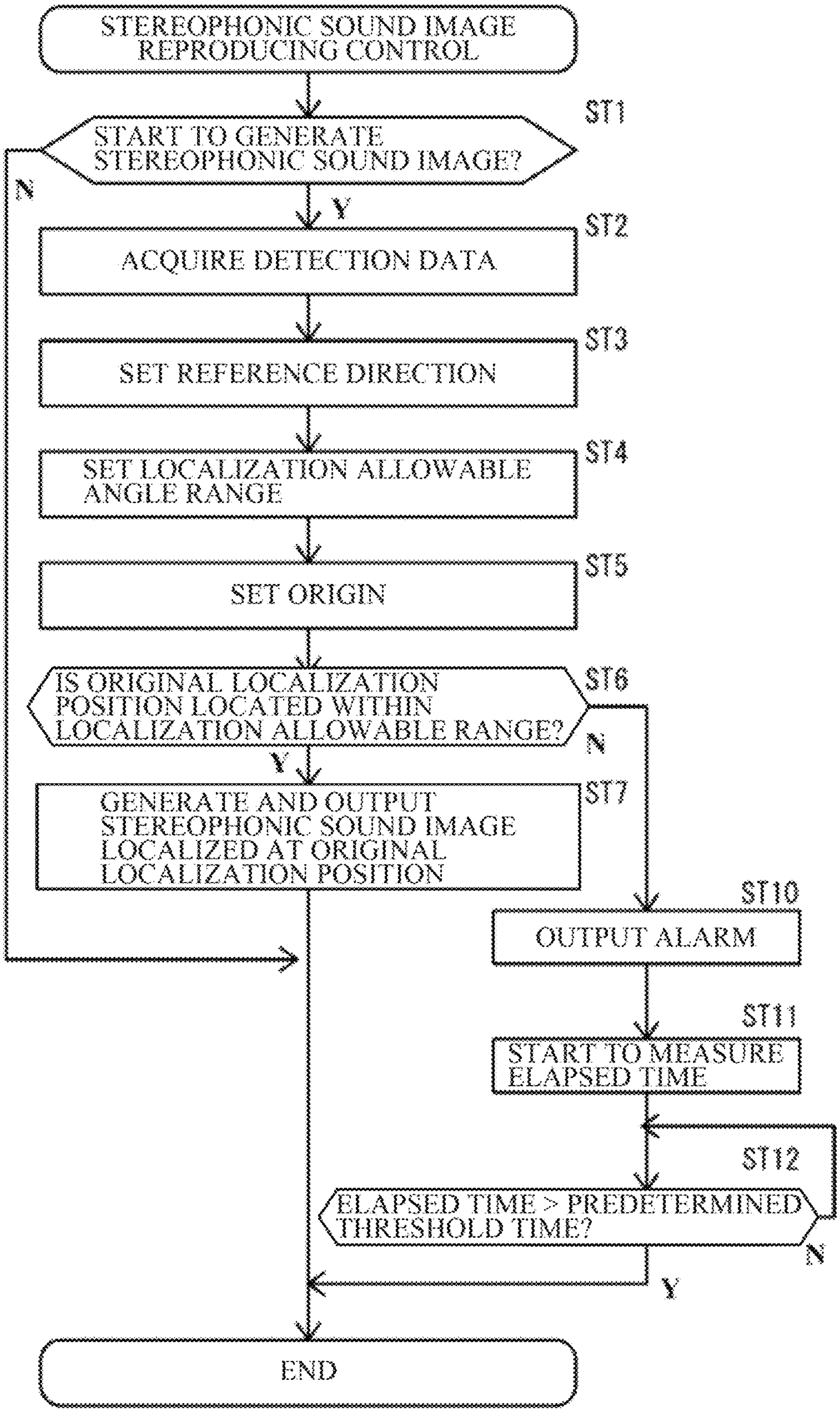
FIG. 6 is a flowchart of stereophonic sound image reproducing control to be executed by a control processor of a stereophonic sound image reproducing system according to one example embodiment of the disclosure.

FIG. 6 is a flowchart of the stereophonic sound image reproducing control to be executed by the control processor 27 of the stereophonic sound image reproducing system 10 according to the second example embodiment.

The control processor 27 of the sound reproducing apparatus 15 may repeatedly execute the stereophonic sound image reproducing control illustrated in FIG. 6 at predetermined intervals.

When determining that the original localization position of the reproduced sound data is not located within the localization allowable angle range in Step ST6 (Step ST6: N), the control processor 27 of the sound reproducing apparatus 15 may cause the process to proceed to Step ST10.

In Step ST10, the control processor 27 may cause the alarm generator 25 to output an alarm to notify the occupant of the stop of the generation of the stereophonic sound image.

In this case, the alarm generator 25 may output the alarm via the right-front speaker 11 and the left-front speaker 12 that are disposed in front of the driver's seat 4 of the automobile 1 out of the speakers 11 to 14 disposed in the automobile 1. Outputting the alarm via these speakers disposed in front of the driver's seat 4 helps to urge the driver to direct his/her attention, face, and line of sight to the front side of the automobile 1.

In Step ST11, the control processor 27 may cause the timer 28 to measure an elapsed time from a current time.

In Step ST12, the control processor 27 may determine whether the elapse time measured by the timer 28 is longer than a predetermined threshold time. The predetermined threshold time may be several seconds, for example.

When the elapsed time is not longer than the predetermined threshold time (Step ST12: N), the control processor 27 may repeat Step ST12.

When the elapsed time is longer than the predetermined threshold time (Step ST12: Y), the control processor 27 may end the control.

As described above, when refraining from starting to generate the sound image localized at the original localization position of the sound source of the reproduced sound data with the sound image generator 23, the control processor 27 of the sound reproducing apparatus 15 may cause the alarm to be outputted via the speakers disposed in front of the driver's seat 4 of the automobile 1 out of the speakers 11 to 14.

Thereafter, the control processor 27 of the sound reproducing apparatus 15 may wait for an elapse of the predetermined threshold time in Step ST12 before ending the stereophonic sound image reproducing control illustrated in FIG. 6.

As a result, a timing when the sound reproducing apparatus 15 will execute the stereophonic sound image reproducing control illustrated in FIG. 6 next may be delayed by the predetermined threshold time from the start of the measurement in Step ST11. Accordingly, a timing when the sound reproducing apparatus 15 will execute Step ST7 in the stereophonic sound image reproducing control illustrated in FIG. 6 next may be delayed by the predetermined threshold time from the start of measurement in Step ST11. In other words, the timing of the generation of the sound image at the original localization position of the sound source of the reproduced sound data by the sound image generator 23 in Step ST7 may be delayed.

Even when the stereophonic sound image localized at the original localization position of the sound source of the reproduced sound data is not generated in the first cycle of the stereophonic sound image reproducing control illustrated in FIG. 6, the stereophonic sound image localized at the original localization position of the sound source of the reproduced sound data may be generated in a subsequent cycle of the stereophonic sound image reproducing control. The stereophonic sound image localized at the original localization position of the sound source of the reproduced sound data may thus be heard by the occupant such as the driver of the automobile 1 at a delayed timing. It is therefore expected that the occupant such as the driver of the automobile 1 becomes less prone to feel strange to the generated stereophonic sound image.

Further, the localization position of the stereophonic sound image is set to be located within the localization allowable angle range, as in the first example embodiment described above. Accordingly, even when the occupant such as the driver directs the face or line of sight toward the localization position of the sound image to turns his/her attention to the localization position of the sound image, the facial direction or the line-of-sight direction of the driver is not largely deviated from the traveling direction of the automobile 1. This allows the occupant such as the driver to easily keep directing the face to the front side of the automobile 1 when the automobile 1 is traveling, and thus helps to prevent the driver from making inattentive driving due to the sound image localized at the original localization position of the sound source of the reproduced sound data.

According to the second example embodiment, when the original localization position of the reproduced sound data is determined not to be located within the localization allowable angle range in Step ST6, (Step ST6: N), the control processor 27 may cause the process to proceed to Step ST10. In Step ST10, the control processor 27 may cause the alarm generator 25 to output an alarm to notify the occupant of the stop of the generation of the stereophonic sound image.

In one example where the original localization position of the reproduced sound data is determined not to be located within the localization allowable angle range in Step ST6, (Step ST6: N), the control processor 27 may cause the process to proceed to Step ST11 without performing Step ST10.

Third Example Embodiment

The automobile 1 according to a third example embodiment will now be described.

In the third example embodiment, stereophonic sound image reproducing control performed by the control processor 27 of the sound reproducing apparatus 15 may be different from those in the example embodiments described above.

For example, a process to be performed after the original localization position of the reproduced sound data is determined not to be located within the localization allowable angle range in Step ST6 may be different from those in the example embodiments described above.

In the following, the differences from the example embodiment described above are described.

Figure 7:
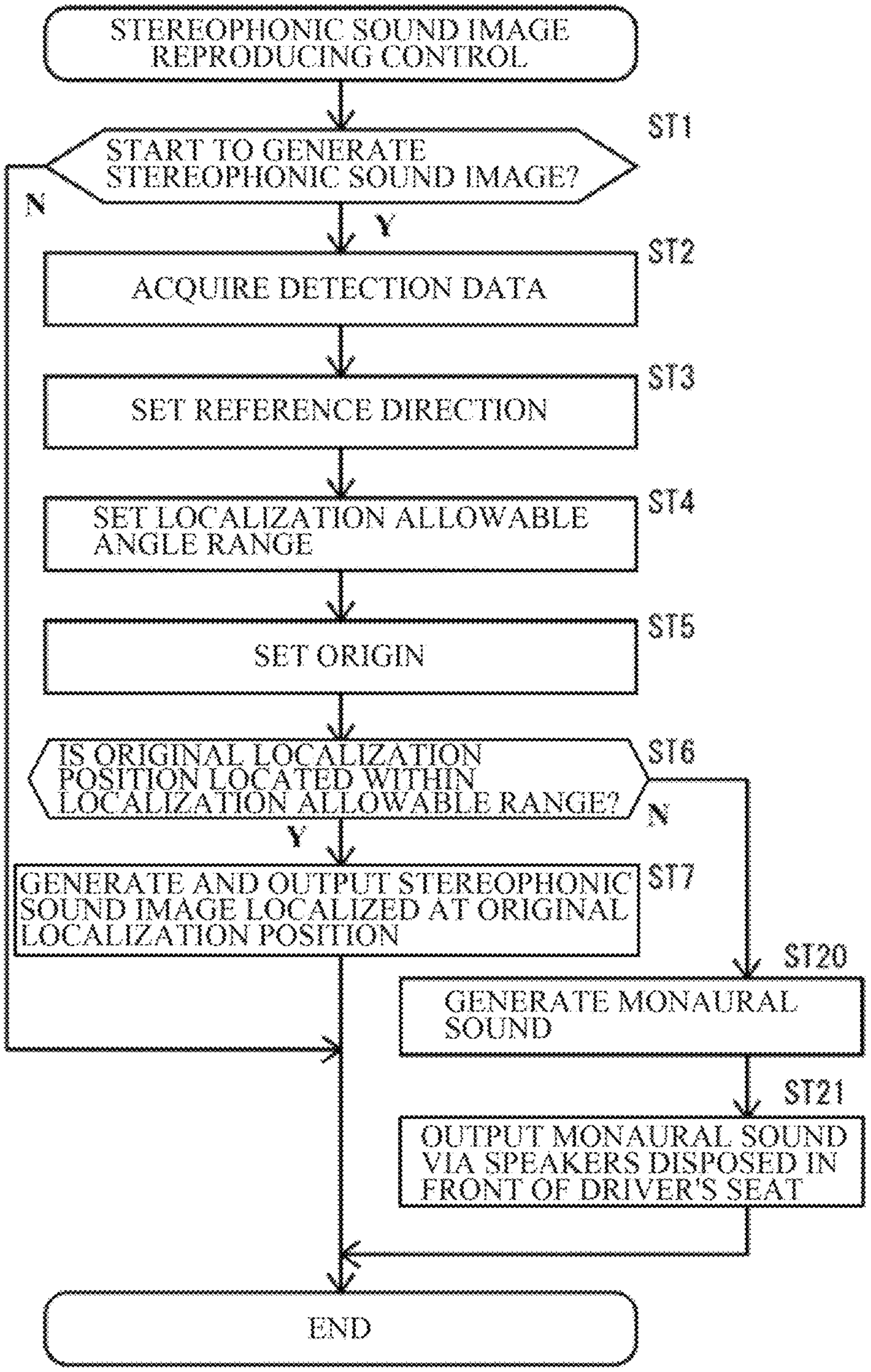
FIG. 7 is a flowchart of the stereophonic sound image reproducing control to be executed by a stereophonic sound image reproducing system according to one example embodiment of the disclosure.

FIG. 7 is a flowchart of the stereophonic sound image reproducing control to be executed by the control processor 27 of the stereophonic sound image reproducing system 10 according to the third example embodiment.

The control processor 27 of the sound reproducing apparatus 15 may repeatedly execute the stereophonic sound image reproducing control illustrated in FIG. 7.

When determining that the localization position of the reproduced sound data is not located within the localization allowable angle range in Step ST6 (Step ST6: N), the control processor 27 of the sound reproducing apparatus 15 may cause the process to proceed to Step ST20.

In Step ST20, the control processor 27 may cause the monaural sound generator 24 to generate a monaural-sound reproducing signal to stop the generation of the stereophonic sound image.

In this case, the monaural sound generator 24 may generate the monaural-sound reproducing signal by changing the sound image to a monaural sound.

In Step ST21, the control processor 27 may cause the monaural sound generator 24 to output the monaural-sound reproducing signal via the right-front speaker 11 and the left-front speaker 12 that are disposed in front of the driver's seat 4 of the automobile 1 out of the speakers 11 to 14 disposed in the automobile 1.

Outputting the monaural sound from the speaker in front of the driver's seat 4 helps to urge the driver to direct his/her attention, the face, and the line of sight to the front side of the automobile 1.

According to the third example embodiment described above, when refraining from starting to generate the stereophonic sound image localized at the original localization position of the sound source of the reproduced sound data with the sound image generator 23, the sound reproducing apparatus 15 may change the sound image to a monaural sound and output the monaural sound via the speakers disposed in front of the driver's seat 4 of the automobile 1 out of the speakers 11 to 14.

Accordingly, even when the sound source is not reproduced as the sound image localized at the original localization position of the reproduced sound data, the sound source may be heard as the monaural sound by the occupant such as the driver of the automobile 1. It is therefore expected that the sound source of the reproduced sound data is heard by the occupant such as the driver of the automobile 1 and that the occupant such as the driver becomes less prone to feel strange to the generated sound.

Further, the sound image may be changed to the monaural sound before being outputted via the speakers disposed in front of the driver's seat 4 of the automobile 1 out of the speakers 11 to 14 disposed in the automobile 1. In this case, the localization position of the sound image is eliminated. This helps to prevent the occupant such as the driver from easily turning turn his/her attention to the sound image. Furthermore, the sound outputted via the speakers disposed on the front side of the automobile 1 urges the occupant such as the driver to turn his/her attention to the front side of the automobile 1. This allows the occupant such as the driver to easily keep directing the face to the front side of the automobile 1 when the automobile 1 is traveling, and thus helps to prevent the driver from making inattentive driving due to the sound image localized at the original localization position of the sound source of the reproduced sound data.

The example embodiments described above may be nonlimiting embodiments of the disclosure, and other modifications and variations may be made within the scope of the disclosure.

In each of the example embodiments described above, the control processor 27 of the sound reproducing apparatus 15 may set the central position of the frontal end of the driver's seat 4 of the automobile 1 as the origin 45 of the localization allowable angle range in Step ST5.

In some embodiments, the origin 45 of the localization allowable angle range may be set at a central position of the frontal end of the automobile 1 disposed in front of the central portion of the frontal end of the driver's seat 4.

In each of the example embodiments described above, when a part of the predetermined angle range extending from the reference direction in the lateral direction of the automobile 1 is located rearward of the width direction of the automobile 1, the control processor 27 of the sound reproducing apparatus 15 may set the remaining part of the predetermined angle range that is located forward of the width direction of the automobile 1 and that excludes the part located rearward of the width direction of the automobile 1 as the localization allowable angle range, as indicated by the dashed-two dotted lines in FIG. 5.

In some embodiments, the control processor 27 of the sound reproducing apparatus 15 may set the predetermined angle range extending from the reference direction as it is as the localization allowable angle range even if the predetermined angle range has the part located rearward of the width direction of the automobile 1.

However, it is undesirable that the driver directs the face or line of sight in the rear direction of the automobile 1 when the automobile 1 is traveling. Therefore, to prevent the driver of the automobile 1 from directing the face or line of sight in the rear direction of the automobile 1 when the automobile 1 is traveling, the control processor 27 of the sound reproducing apparatus 15 may set the angle range that is located forward of the width direction of the automobile 1 and that excludes the part located rearward of the width direction of the automobile 1 as the localization allowable angle range.

In the first example embodiment described above, when refraining from starting to generate the stereophonic sound image localized at the original localization position of the sound source of the reproduced sound data, the control processor 27 of the sound reproducing apparatus 15 may execute a first process in which the localization position of the sound image is changed to another localization position located within the localization allowable angle range and cause the sound image generator 23 to generate the sound image localized at the other localization position.

In the second example embodiment described above, when refraining from starting to generate the stereophonic sound image localized at the original localization position of the sound source of the reproduced sound data, the control processor 27 of the sound reproducing apparatus 15 may execute a second process in which an alarm is outputted from the speakers disposed in front of the driver's seat 4 of the automobile 1 out of the speakers 11 to 14, and a third process in which the timing when the sound image generator 23 starts to generate the stereophonic sound image localized at the original localization position of the sound source of the reproduced sound data is delayed.

In the third example embodiment described above, when refraining from starting to generate the stereophonic sound image localized at the original localization position of the sound source of the reproduced sound data, the control processor 27 of the sound reproducing apparatus 15 may execute a fourth process in which the sound image is changed to a monaural sound, and the monaural sound is outputted via the speakers disposed in front of the driver's seat 4 of the automobile 1 out of the speakers 11 to 14.

In some embodiments, when refraining from starting to generate the stereophonic sound image localized at the original localization position of the sound source of the reproduced sound data, the control processor 27 of the sound reproducing apparatus 15 may execute the first to fourth processes in an appropriate combination or in a switching manner.

The invention claimed is:

1. A stereophonic sound image reproducing system for a vehicle, the stereophonic sound image reproducing system comprising:

speakers configured to be disposed in the vehicle;

a sound reproducing apparatus comprising a sound image generator, the sound image generator being configured to generate, with the speakers, a sound image localizable at least in a longitudinal direction of the vehicle; and a vehicle sensor configured to detect: one or both of a facial direction of a driver who drives the vehicle and a traveling direction of the vehicle; or one or both of a line-of-sight direction of the driver and the traveling direction of the vehicle, wherein the sound reproducing apparatus is configured to set, before the sound image generator starts to generate the sound image at an original localization position of a sound source, an angle range extending from a reference direction in a lateral direction of the vehicle as a localization allowable angle range, the reference direction comprising the facial direction of the driver, the line-of-sight direction of the driver, the traveling direction of the vehicle, a direction between the facial direction of the driver and the traveling direction of the vehicle, or a direction between the line-of-sight direction of the driver and the traveling direction of the vehicle that is detected by the vehicle sensor before the sound image is generated, determine whether the original localization position of the sound image starting to be generated is located within the localization allowable angle range, start to generate, with the sound image generator, the sound image at the original localization position when the original localization position of the sound image starting to be generated is determined to be located within the localization allowable angle range, and refrain from starting to generate the sound image at the original localization position when the original localization position of the sound image starting to be generated is determined not to be located within the localization allowable angle range.

2. The stereophonic sound image reproducing system according to claim 1, wherein the sound reproducing apparatus is configured to determine whether the original localization position of the sound image starting to be generated is located within the localization allowable angle range based on an origin of the localization allowable angle range, the origin being set at a position of a driver's seat of the vehicle.

3. The stereophonic sound image reproducing system according to claim 2, wherein, when a part of the angle range extending from the reference direction in the lateral direction of the vehicle is located rearward of a width direction of the vehicle, the sound reproducing apparatus is configured to set a remaining part of the angle range that is located forward of the width direction of the vehicle and that excludes the part located rearward of the width direction of the vehicle as the localization allowable angle range.

4. The stereophonic sound image reproducing system according to claim 3, wherein, when refraining from starting to generate, with the sound image generator, the sound image at the original localization position, the sound reproducing apparatus is configured to delay a timing when the sound image generator starts to generate the sound image at the original localization position, change the original localization position of the sound image to another localization position located within the localization allowable angle range, and cause the sound image generator to generate a sound image at the other localization position.

5. The stereophonic sound image reproducing system according to claim 3, wherein, when refraining from starting to generate, with the sound image generator, the sound image at the original localization position, the sound image reproducing apparatus is configured to change the sound image to a monaural sound, and output the monaural sound via a speaker disposed in front of the driver's seat of the vehicle out of the speakers.

* * * * *